United States Patent [19]
Dentinger et al.

[11] Patent Number: 6,166,384
[45] Date of Patent: Dec. 26, 2000

[54] METHOD AND APPARATUS FOR MINIMIZING BLURRING AND GENERATING A HIGH RESOLUTION IMAGE IN A RADIATION IMAGING SYSTEM

[75] Inventors: Aaron Mark Dentinger, Albany; Sung Su Han, Niskayuna; Sameh Mahmoud Sowelam, Clifton Park, all of N.Y.

[73] Assignee: General Electric Company, Schenectady, N.Y.

[21] Appl. No.: 09/187,208

[22] Filed: Nov. 6, 1998

[51] Int. Cl.$^7$ ..................................... G01T 1/24
[52] U.S. Cl. .............. 250/370.09; 250/370.08; 250/370.11; 250/371
[58] Field of Search .............. 250/370.09, 370.11, 250/370.08, 371

[56] References Cited

U.S. PATENT DOCUMENTS

| | | | |
|---|---|---|---|
| 4,719,350 | 1/1988 | Alm | 250/330 |
| 5,142,286 | 8/1992 | Ribner et al. | 341/143 |
| 5,265,013 | 11/1993 | King et al. | 378/4 |
| 5,340,988 | 8/1994 | Kingsley et al. | 250/370.09 |
| 5,847,398 | 12/1998 | Shahar et al. | 250/370.09 |
| 5,881,162 | 3/1999 | Ishimitshu | 382/132 |
| 5,925,875 | 7/1999 | Frey | 250/208.1 |

OTHER PUBLICATIONS

"Two–Dimensional Signal and Image Processing", J.S. Lim, Finte Impulse Response Filters, Chapter 4, pp. 218–237. 1990.

"Discrete–Time Signal Processing", Oppenheim and Shafer; Filter Design Techniques, Chapter 7, pp. 462–480. 1989.

Primary Examiner—Constantine Hannaher
Assistant Examiner—Albert Gagliardi
Attorney, Agent, or Firm—Jill M. Breedlove; Douglas E. Stoner

[57] ABSTRACT

A method for generating a high resolution image in a radiation imaging system which produces multiple exposure signals from a movable detector array is disclosed. The image data signals or image acquisition signals generated from the image detector assembly of the image radiation system during an imaging cycle are passed through a finite impulse response filter having a combined frequency response comprised of an inverse filter frequency response portion and a noise regularization frequency response portion such that the noise regularization decrease the frequency response of the filter as the frequency of the data signals increase thereby effectively preventing blurring of the image produced from the image data signals.

34 Claims, 5 Drawing Sheets

METHOD AND APPARATUS FOR MINIMIZING BLURRING AND GENERATING A HIGH RESOLUTION IMAGE IN A RADIATION IMAGING SYSTEM

BACKGROUND OF THE INVENTION

The present invention relates to a method and apparatus for minimizing blurring of an image in a radiation imaging system, more particularly a method which combines inverse filtering and suppression of noise at frequencies, where the signal-to-noise ratio (SNR) is low to generate a high resolution signal appropriate for driving a display and analysis module and which employs a filter having a frequency response which combines inverse filtering and noise regularization and which is controlled by a single parameter such that the noise regularization decrease the frequency response of the filter as the frequency of the signal increases.

High resolution radiation imaging systems are well-known in the art, as exemplified by U.S. Pat. No. 5,340,988 assigned to General Electric Company, the assignee of the instant application. Such radiation imaging systems are typically used in medical imaging, in which radiation passing through, or emanating from, a patient's body is used to visualize objects or materials within the body. Digital imaging systems typically use a two dimensional array of photosensors to convert radiation into an image where intensity is proportional to the incident radiant energy. The incident radiation can either be converted first to optical photons by a scintillator and then to an electrical signal or the incident radiation can be converted directly into an electrical signal. The signal from a photosensor represents an individual pixel in the digital image. Medical imaging devices exhibit high spatial frequency response, short image acquisition time and high detective quantum efficiency.

In order to improve the resolution of the resultant image, the above-identified U.S. patent provides a radiation imaging system having a photosensor pixel array that is movable to a plurality of sequential imaging positions according to a predetermined imaging cycle and an image processor electrically coupled to receive image data signals generated by respective ones of the photosensor pixels in the array. The image processor stores the image data signals generated during an imaging cycle as an unfiltered data set, the image processor further comprising a deblurring filter adapted to selectively filter the unfiltered data set to generate a fine resolution data set.

The sequential imaging positions are selected such that during one imaging cycle the aliasing errors are cancelled in the generation of the fine resolution data set.

Typically the plurality of sequential imaging positions comprises four imaging positions, the positions being respectively disposed such that the distance between adjacent imaging positions along a selected axis of movement for the photosensor pixel array are such that, in each respective imaging position, each photosensor pixel in the imager is centered on only one of the respective areas represented in each pixel element in the output fine resolution array in each imaging position. Typically, the distance between adjacent imaging positions along the selective axis of movement is substantially one-half the pitch of the photosensor pixel array, the pitch being the distance between centers of adjacent pixels.

The limiting factor in the resolution of a digital imaging system is the pixel pitch, the distance between centers of adjacent photosensor pixels in the array. The smaller the pixel pitch, the higher are the spatial frequencies that can be unambiguously detected by the array, the highest unambiguous frequency which can be detected being known as the Nyquist frequency. Frequencies above the Nyquist frequency will appear at lower frequencies in the digital image. Such phenomenon is referred to as aliasing and results in distortion of the high frequency components of the original signal. As a practical matter, the pixel pitch of the pixel array and, hence the resolution, are limited by the costs and the difficulty in manufacturing photosensor arrays having extremely small pixel pitches.

Figure 1:
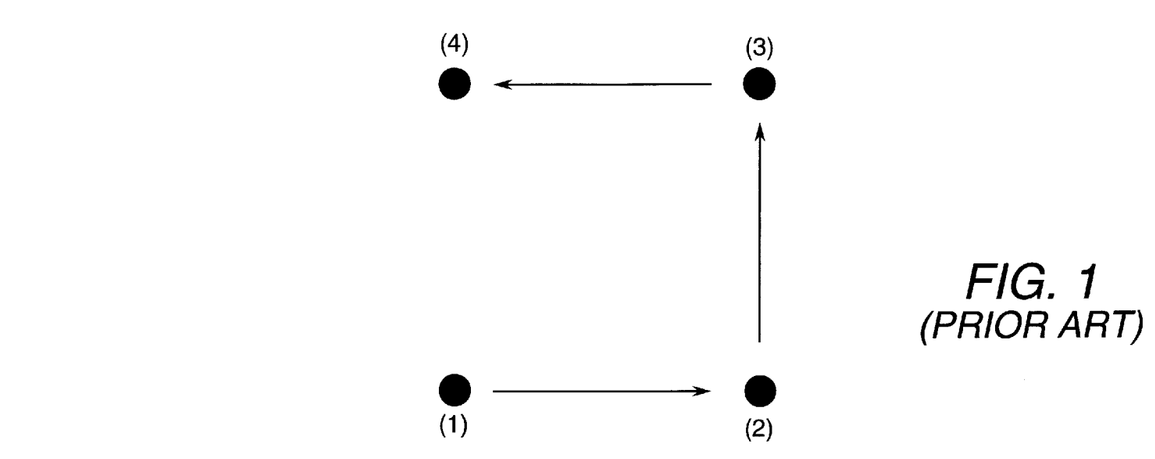
FIG. 1 is a schematic representation of the movement of a moving pixel array according to the prior art.

The aforementioned technique is known as oversampling and is a known method of obtaining a higher resolution image using a lower resolution detector. When a photosensor array is used in an oversampling mode, multiple exposures are taken with the same photosensor array positioned at different locations. A high resolution image can be obtained by sequentially moving the array by one-half the pixel pitch to four different imaging locations and interleaving respective image data to form a high resolution image. As illustrated in FIG. 1, a first image is taken at 1, the photosensor array is moved to the right by a distance equal to one-half of the pixel pitch and a second image is taken at 2. Then, the array is moved in an upward direction for a third image at 3 and, finally, moved to the left for the last image at 4. In each instance, the distance moved by the array is equal to one-half of the pixel pitch. The four images are then combined into an oversampled image by interleaving the pixels according to their relative positions. The oversampled image has four times the number of pixels as a single image which essentially reduces the pixel pitch by one-half, thereby doubling the resolution of the imaging system. Although four images have been used as an example to demonstrate the fundamentals of oversampling, it is to be understood that more, or less, than four images may be utilized. If the photosensor array is moved n times in a given direction, the oversampled image will alter the pixel pitch accordingly.

The oversampled image is degraded during acquisition by the system modulation transfer function, with main causes being the pixel's finite aperture size and the frequency selectivity of the scintillator. This degradation can be modeled as a linear system and a transfer function can be mathematically derived, or experimentally measured, to form an overall blurring function. Given an overall, or a partial, blurring function, the interleaved image can be filtered in such a way as to undo the effects of the degradation of the image. The interleaved image also contains additive noise that must taken into account, since disregarding the noise while filtering can severely amplify the high frequency noise and further degrade the image.

In the image processing field, the blurring problem described above falls under the general heading of image restoration. Image restoration attempts to reduce or eliminate degradation of an image to be displayed by using information about the degradation and the image acquisition signals. Typically, in this environment, the image acquisition signal is degraded by two factors, additive random noise and blurring. Techniques in image processing to combat these effects include Wiener filtering, Kalman filtering, regularized inverse filtering and iterative restoration algorithms.

For images degraded only by noise, image processing techniques to deal with additive noise are based on Wiener filtering. Wiener filtering provides an optimal linear minimum mean square estimate of the original image. The Wiener filter requires knowledge of both the signal and the noise spectra for specifying the filter's frequency response. The result of the Wiener filtering is to preserve the high signal-to-noise ratio frequency components, while attenuating the lower signal-to-noise frequency components. Typically, Wiener filters tend to be lowpass filters.

Techniques to counteract the effect of a known blurring function are referred to as inverse filtering, deblurring, or deconvolution. These techniques produce a filter whose frequency response, $H_{inv}(v_x, v_y)$, is the inverse of the blurring function, or:

$$H_{inv}(v_x, v_y) = \frac{1}{B(v_x, v_y)}$$

where $v_x$ and $v_y$ are the spatial frequencies and $B(v_x, v_y)$ is the Fourier transform of the blurring function. Typically, the blurring function has a lowpass frequency spectrum.

An inherent problem with inverse filtering is that the frequency response becomes very large at frequencies where the Fourier transform of the blurring function is very small. If noise is present at high frequencies, which is normally the case, the filter will greatly emphasize or amplify the noise at frequencies with a low signal-to-noise ratio. As a result, inverse filtering alone can adversely impact the quality of the displayed image.

To account for additive noise and blurring simultaneously, the inverse filtering must be modified, or regularized, to reduce the noise enhancement at frequencies where the frequency response becomes too large or the signal-to-noise ratio is too small. Wiener filtering and inverse filtering can be combined by cascading the two filters to produce an optimal linear estimator minimizing the mean squared error for a signal degraded by blurring and additive noise. However, this technique requires knowledge of the noise and signal spectra which are often not readily available.

Thus, a need exists for a filter and method for deblurring the image data or acquisition signals generated in the image detector assembly during an imaging cycle of a radiation imaging system which accounts for the above criteria when the noise and signal spectra are not accurately known.

BRIEF SUMMARY OF THE INVENTION

The present invention is a method and apparatus for restoring an oversampled image which would otherwise be degraded by blurring and additive noise. The image data signals from the image detector assembly of the radiation imaging system is passed through a filter having a frequency response which combines inverse filtering and noise regularization controlled by a single parameter. The combined frequency response of the filter is controlled by a single parameter which comprises an inverse filter frequency response portion and a noise regularization frequency response portion, wherein the noise regularization decreases the frequency response of the filter as the frequency of the signal increases.

The inversion filtering inverts the effect of blurring the imaging data or acquisition signal, such as that from the scintillator and the aperture. The blurring is modeled as a linear shift-invariant process and can be expressed as a convolution of the original image with the blurring function. The second portion of the frequency response of the filter is the regularization portion to reduce the noise enhancement by the inverse filter at frequencies with a low signal-to noise ratio. The specific properties of the signal and the noise spectra are not known, but general characteristics are known. Both the signal power and the noise power are assumed to decrease with frequency, but in such a way that the signal-to-noise ratio will decrease as a function of the frequency. Thus, the noise regularization portion decreases the response of the filter as the frequency increases to prevent noise enhancement in the low signal-to-noise ratio regions.

DETAILED DESCRIPTION OF THE INVENTION

Figure 2:
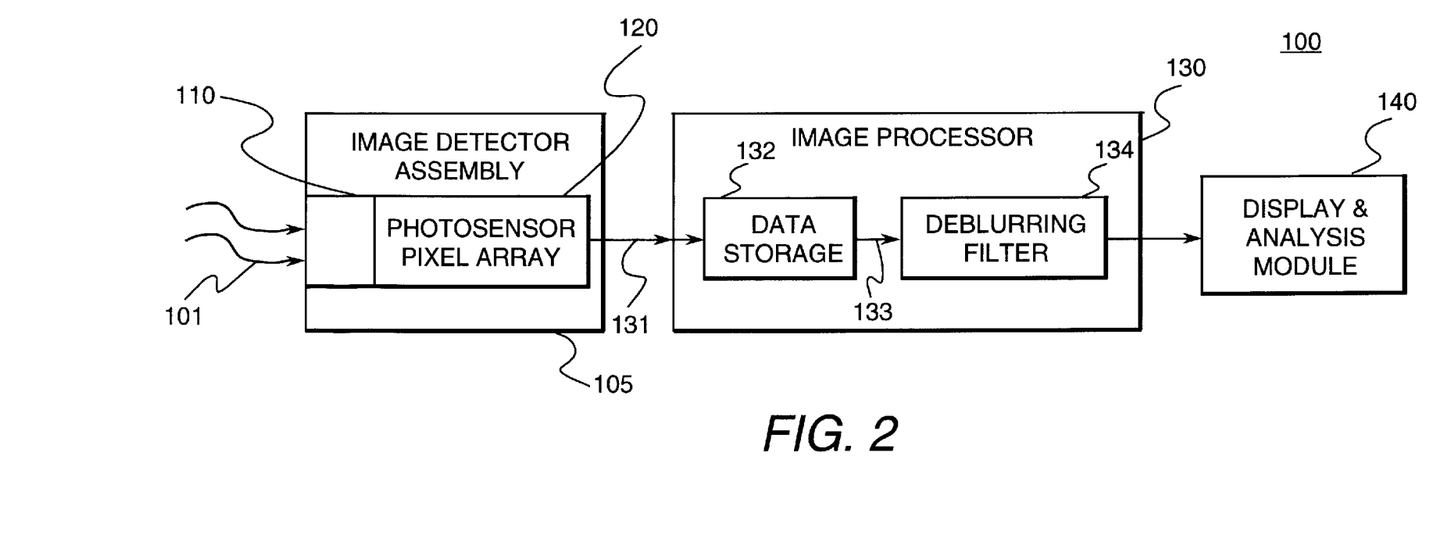
FIG. 2 is a block diagram of a radiation imaging system comprising the present invention.

Referring to FIG. 2, there is illustrated a radiation imaging system 100 for detecting incident radiation is shown comprising an image detector assembly 105, an image processor 130, and a display and analysis module 140. Image detector assembly comprises a photosensor pixel array 120, which, in one embodiment, is optically coupled to a scintillator 110. Scintillator 110 is disposed to receive incident radiation rays 101, such as x-rays or the like. Optical photons generated in scintillator 110 in response to incident radiation 101 pass to photosensor pixel array 120 in which the light is detected and corresponding image data signals are generated by photosensors in the array. Image processor 130 comprises a data storage device 132 and a deblurring filter 134, and is electrically coupled to photosensor array 120 via line 131 to receive and store in data storage device 132 the respective image data signals generated during oversampling the imaged object, that is the generation of image data signals from exposures to radiation in respective sequential imaging positions in the course of an imagine cycle. The unfiltered image set stored during an imagine cycle of radiation imaging system 100 is applied via line 133 to deblurring filter 134 to generate a non-aliased fine resolution data set having the desired increased spatial resolution and thence coupled to display and analysis module 140.

Photosensor array 120 comprises a plurality of photosensor pixels, such as photodiodes or the like arranged in rows and columns typically in an NxM matrix arrangement, with each photosensor being connected to an address line and a scan line (not shown) to allow charge developed in each respective photosensor in response to incident light to be read. In medical imagers, it is desireable to provide a photosensor in which the active pixel area is a large portion of the photosensor as the greater area maximizes the fraction of x-rays which are imaged so that patient radiation dose is lessened while still generating images of acceptable quality. A photosensor pixel array arrangement suitable for use in the present invention is described and illustrated in the aforenoted U.S. Pat. No. 5,340,988.

Typically scintillator 110 is disposed adjacent to photosensor pixel array 120 such that optical photons generated in scintillator 110 predominantly pass into photosensor pixel array 120 in close proximity to the point where the incident radiation was absorbed. Scintillator 110 typically comprises a scintillator material having a relatively large absorption cross section for the type of incident radiation 101 used with the imaging system 100. For example, in x-rays imagers, scintillator materials such as secium iodide, sodium iodide, or the like are commonly used. In an alternative arrangement (not shown), image detector assembly 105 comprises a photosensitive and radiation absorptive material, such as lead oxide (PbO), thallium bromide (TlBr), or the like, which both absorbs the incident radiation and generates mobile charge particles which can be used to detect and measure the incident radiation.

Details of construction of the photosenor pixel array are illustrated and described in the aforenoted U.S. Pat. No. 5,340,988.

Image detector assembly 105 is electrically coupled to image processor 130, which comprises a data storage device 132 and a deblurring filter 134. Data storage device 132 comprises a computer adapted to store and process digital information. Similarly, deblurring filter 189 comprises a digital data processing device adapted to apply Wiener filtering to image data signals generated in the image detector assembly 105 during an imaging cycle and that are stored in data storage device 122.

In accordance with the present invention radiation imaging system 100 is adapted to generate an output to drive display and analysis module 140 based upon oversampling, that is multiple images of the object acquired from positioning photosensor array 120 in a predetermined number of spatially separate imaging positions in accordance with a predetermined imaging cycle. After data from one imaging cycle has been acquired, the unfiltered data set is applied to deblurring filter 134 to generate a high resolution image for display and analysis. The next imaging cycle, in which the photosensor array is again positioned in the predetermined imaging positions, provides the next set of unfiltered data which is applied to the deblurring filter to generate the next high resolution image.

In accordance with the present invention the image data or acquisition signals of an oversampled image which have been degraded by blurring and additive noise are restored or deblurred by passing the image acquisition signal through a filter 134 which is a finite impulse response filter in which the filter's desired frequency characteristics are determined from information about the imaging system. The filter 134 comprises a combination of an inverse filtering portion and noise regularization portion which is controlled by a single parameter. The inversion filtering inverts the effect of blurring in the image acquisition data, such as from the scintillator and the aperture. The blurring function, b(x,y), for the specific application is assumed to be known, but it is assumed that the noise and signal spectra are not accurately known. The blurring is modeled as a linear shift-invariant process and can be expressed as a convolution of the original image with the blurring function. In the frequency domain, the convolution becomes a multiplication of the Fourier transforms of the image and blurring function, $B(v_x, v_y)$ where $v_x$ and $v_y$ are the spatial frequencies in the x and y directions. Additionally, the frequency response of the blurring function is assumed to be approximately circularly symmetric, so that the frequency response is completely specified by a 1-D radial cut, $B(v_r)$ where $$v_r = \sqrt{(V_x^2 + V_y^2)}$$

is the radial frequency. The inverse filter portion of the frequency response is typically a high pass filter because it is found by inverting the lowpass blurring function B ($V_x$, $V_g$).

The second portion of the frequency response filter is the regularization portion adapted to reduce the noise enhancement by the inverse filter at frequencies with a low signal-to-noise ratio (SWR). Although the specific properties of the signal and noise spectra are not known, the general characteristics are known. The signal power and the noise power are assumed to decrease with frequency, but in such a way that the signal-to-noise ratio will decrease as a function of frequency. Thus, the regularization portion of the filter should decrease the response of the filter as the frequency increases to prevent noise enhancement in the low signal-to-noise ratio regions. The point at which the noise overcomes the signal is represented by a parameter α used to control the transition where the inversion stops and the noise regularization begins.

The combined frequency response of the filter is given by:

$$H(v_r) = \begin{cases} H_{inv}(v_r), & v_r \leq \alpha \\ H_{reg}(v_r), & v_r > \alpha \end{cases}$$

where $H_{inv}$ ($v_r$) is the frequency response for the inverse filtering portion and $H_{reg}$ ($v_r$) is the frequency response for the noise regularization portion. The transition frequency α is related to the signal and noise spectra and the signal-to-noise ratio, but since the spectra are not known, the parameter must be determined for each particular application by visual inspection. The frequency response need only be specified up to the Nyquist frequency corresponding to the oversampled pixel pitch. In addition to decreasing with frequency, there must be continuity at the transition point between the inverse filtering portion and the regularization portion.

Figure 3:
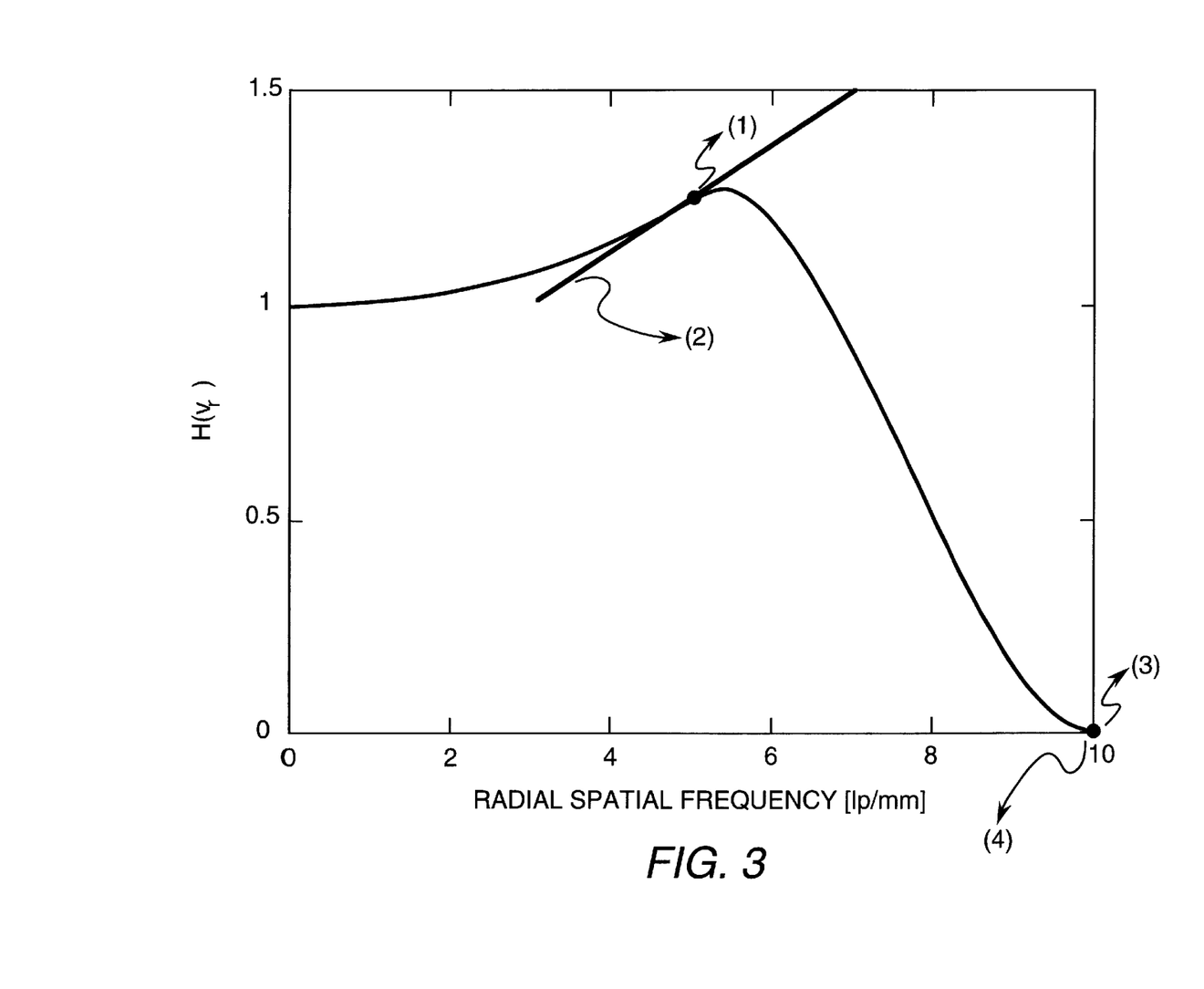
FIG. 3 is a graphical representation of the spatial frequency versus the filter frequency with four constraints shown.

FIG. 3 illustrates a suitable regularization function for a 1-D radial cut as an $n^{th}$ order polynomial with the following constraints: (1) continuity at α; (2) a continuous slope at α; (3) zero response at the oversampled Nyquist frequency; and (4) zero slope at the oversampled Nyquist frequency. These constraints can be mathematically illustrated by:

$$H_{reg}(\alpha) = H_{inv}(\alpha) \quad (1)$$

$$\frac{\partial H_{reg}(\alpha)}{\partial v_r} = \frac{\partial H_{inv}(\alpha)}{\partial v_r} \quad (2)$$

$$H_{reg}(V_{Nyquist}) = 0 \quad (3)$$

$$\frac{\partial H(V_{Nyquist})}{\partial V_r} = 0 \quad (4)$$

Figure 4:
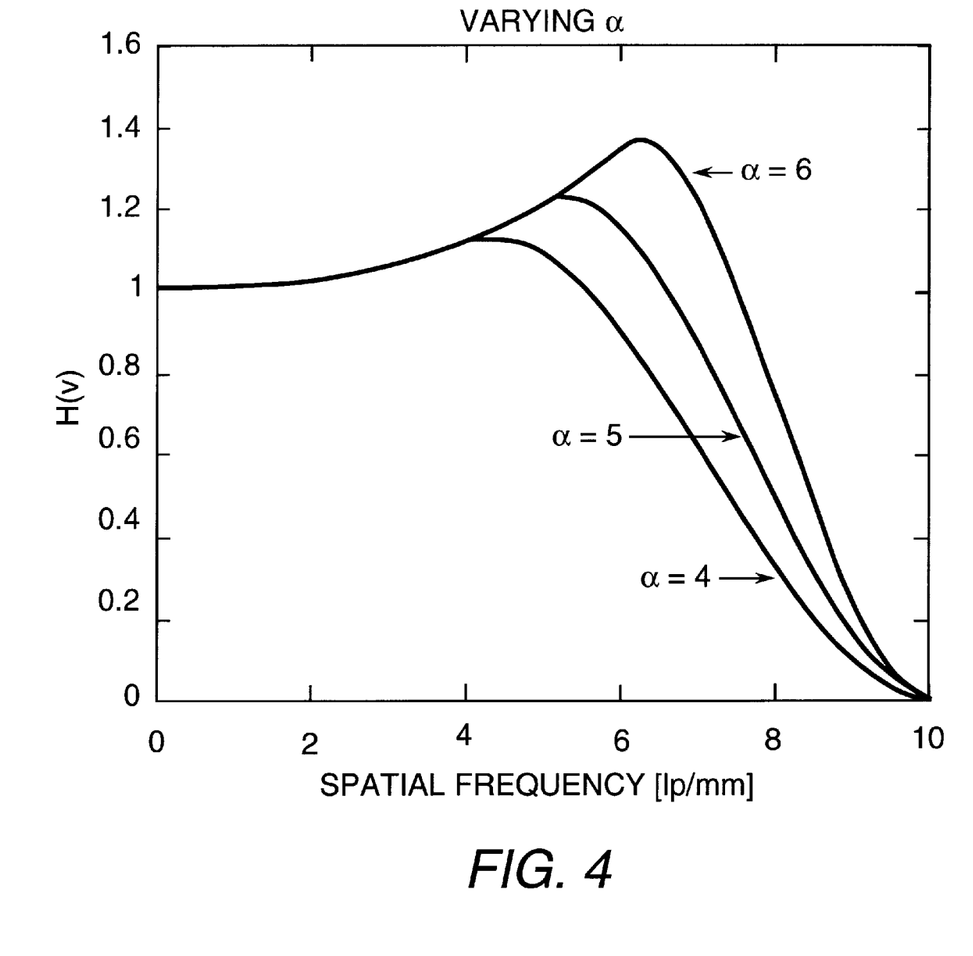
FIG. 4 is a graphical representation of the spatial frequency versus the filter frequency for varying values of $\alpha$.

FIG. 4 illustrates the combined frequency response using a fourth order polynomial and the constraints listed above for several different values of α. Using the method according to the present invention, the first step is to specify the frequency characteristics and the next step is to ascertain a set of real coefficients for a finite impulse response (FIR) filter 134 that approximates the desired response given predetermined limitations on the filter size and the coefficient precision. The implementation of the method limits the shape of the frequency responses that the filter can approximate. For example, frequency responses with steep transition regions require a larger number of coefficients to accurately fit the transition.

Since the desired 2-D response is circularly symmetric, the frequency transform method is used to generate the 2-D FIR filter coefficients. The frequency transform is initiated by finding a set of 1-D coefficients which approximate the desired radial frequency response. Methods for 1-D filter design are well-known, such as the Parks-McClellan algorithm which produces an optimal equal-ripple FIR filter. See, "Discrete-Time Signal Processing," by Oppenheim and Schafer, copyright 1989, Prentice Hall and "Two-Dimensional Signal and Image Processing," by J. S. Lim, copyright 1990, Prentice Hall.

Figure 5:
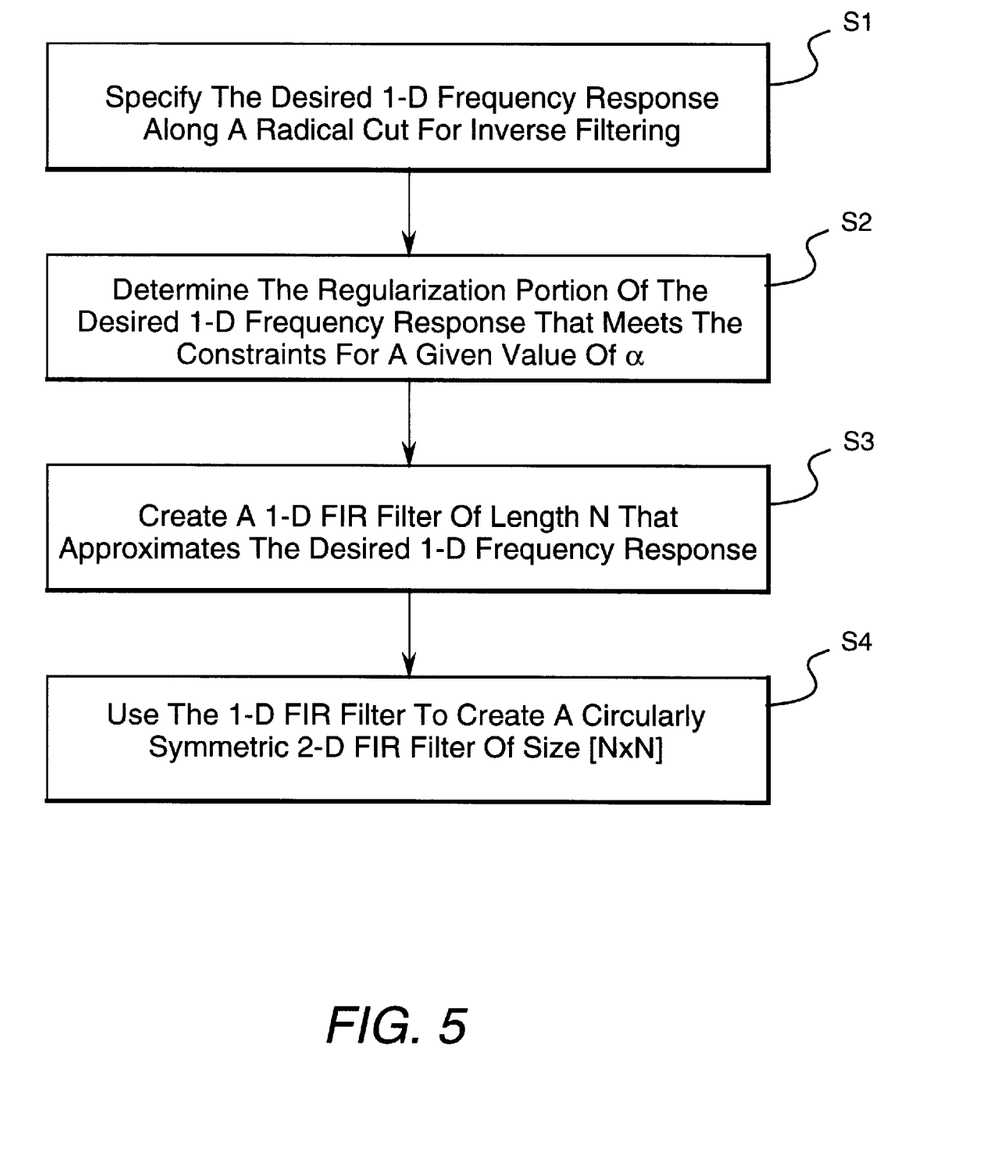
FIG. 5 is a block diagram of the steps for generating the 2-D blurring filter.

FIG. 5 is a block diagram of the steps for generating the 2-D deblurring filter according to the present invention. In the step S1, the 2-D filter is formed by transforming the 1-D filter onto a 2-D contour. To do this, the desired 1-D frequency response along a radial cut for inverse filtering is specified. Then, in the step S2, the regularization portion of the desired 1-D frequency response that meets the constraints for a given value of α is determined. Next, the step S3 specifies the creation of a 1-D FIR filter of length N that approximates the desired 1-D frequency response, and in the step S4, the 1-D FIR filter is used to create a circularly symmetric 2-D FIR filter of size [NxN]. The McClellan transform is used because of its ability to produce approximately circularly symmetric 2-D filters.

Figure 6:
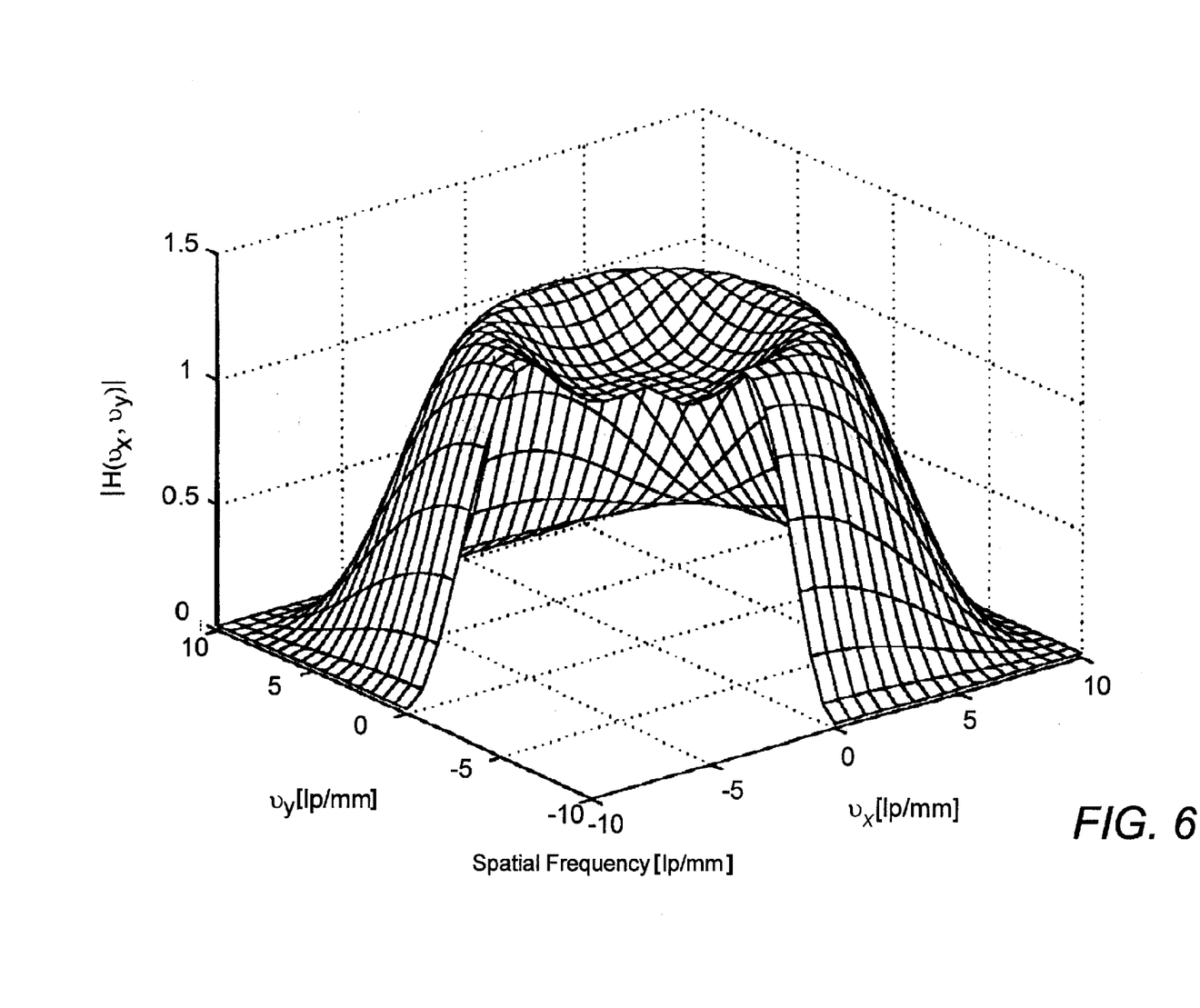
FIG. 6 is a graphical representation of the 2-D frequency response in terms of the spatial frequency versus the filter frequency.

FIG. 6 is a graphical representation of 2-D frequency response in terms of the spatial frequency versus the filter frequency.

The result of the deblurring method according to the present invention is a set of 2-D, finite infinite response filters having the desired characteristics for deblurring and noise suppression. The filter can then be applied to the image using direct convolution.

The method for minimizing blurring of an image of a radiation imaging system and generating a high resolution image in accordance with this invention has been described above for the purpose of explanation and not limitation in the context of an imaging cycle in which four imaging positions are used to oversample the object to be imaged. Such oversampling is more fully described in the aforenoted U.S. Pat. No. 5,340,998 which is incorporated herein by reference in its entirety. Accordingly, it should be therefor readily apparent that oversampling can be achieved through the use of K imaging positions and appropriately interleaving unfiltered data in an unfiltered data set.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A method of generating a high resolution image of incident radiation by a radiation imaging system which produces multiple exposure image data signals from a movable detector array comprising passing the image data signals through a finite impulse response deblurring filter having a combined frequency response comprising an inverse filter frequency response portion and a noise regularization frequency response portion wherein the noise regularization decreases the frequency response of the filter as the frequency of the signal increases.

2. The method according to claim 1 wherein the combined frequency response of the filter is given by:

$$H(v_r) = \begin{cases} H_{inv}(v_r), & v_r \leq \alpha \\ H_{reg}(v_r), & v_r > \alpha \end{cases}$$

wherein: $H(v_r)$=combined frequency response
$H_{inv}(v_r)$=inverse filter frequency response
$H_{reg}(v_r)$=regulation frequency response $$v_r = \text{radial frequency } v_r = \sqrt{(V_x^2 + V_y^2)}$$

$v_x$, $v_y$=spatial frequencies in x and y directions
α=transition frequency between inversion and regularization portions.

3. The method according to claim 2 further comprising selecting a regularization function of the filter as an $n^{th}$ order polynomial wherein:

$H_{reg}(\alpha) = H_{inv}(\alpha)$ $H_{inv}$=inverse filter frequency response
$H_{reg}$=regularization frequency response
α=transition frequency between inverse filter frequency response portion and noise regularization frequency response portion.

4. The method according to claim 2 further comprising selecting a regularization function of the filter as an $n^{th}$ order polynomial wherein:

$$\frac{H_{reg}(\alpha)}{\partial v_r} = \frac{H_{inv}(\alpha)}{\partial v_r}$$

$H_{reg}$=regularization frequency response
$H_{inv}$=inverse filter frequency response $$v_r = \text{radial frequency } v_r = \sqrt{(V_x^2 + V_y^2)}$$

$v_x$, $v_y$=spatial frequencies in x and y directions
α=transition frequency between inverse filter frequency response portion and noise regularization frequency response portion.

5. The method according to claim 1 wherein image data signals produced by the radiation imaging system have an oversampled Nyquist frequency and further comprising selecting the noise regularization frequency response portion of the filter as an $n^{th}$ order polynomial having zero response at the oversampled Nyquist frequency wherein:

$H_{reg}(v_{NYQUIST})=0$ where:
$H_{reg}(v_{NYQUIST})$=noise regularization frequency response at Nyquist frequency.

6. The method according to claim 1 wherein the image data signals produced by the radiation imaging system have an oversampled Nyquist frequency and further comprising selecting the noise regularization frequency response portion of the filter as an $n^{th}$ order polynomial having zero slope at the Nyquist frequency wherein:

$$\frac{H_{reg}(V_{Nyquist})}{\partial V_r} = 0$$

where:
$H_{reg}(v_{NYQUIST})$=noise regularization frequency response at Nyquist frequency $$v_r = \text{radial frequency } v_r = \sqrt{(V_x^2 + V_y^2)}$$

$v_x$, $v_y$=spatial frequency in x and y directions.

7. The method according to claim 1 wherein the image data signals produced by the radiation imaging system have an oversampled Nyquist frequency and, a frequency $\alpha$ at the transition between the inverse frequency response portion and the noise regularization frequency response portion, and further comprising selecting the noise regularization frequency response portion of the filter as an $n^{th}$ order polynomial having:

a) continuity at $\alpha$;
b) a continuous slope at $\alpha$;
c) zero response at the oversampled Nyquist frequency; and
d) zero slope at the oversampled Nyquist frequency.

8. The method according to claim 2 wherein image data signals produced by the radiation imaging system have an oversampled Nyquist frequency and further comprising selecting the noise regularization frequency response portion of the filter as an $n^{th}$ order polynomial having zero response at the oversampled Nyquist frequency wherein:

$H_{reg}(v_{NYQUIST})=0$ where:
$H_{reg}(v_{NYQUIST})$=noise regularization frequency response at Nyquist frequency.

9. The method according to claim 2 wherein the image data signals produced by the radiation imaging system have an oversampled Nyquist frequency and further comprising selecting the noise regularization frequency response portion of the filter as an $n^{th}$ order polynomial having zero slope at the Nyquist frequency wherein:

$$\frac{H_{reg}(V_{Nyquist})}{\partial V_r} = 0$$

where:
$H_{reg}(v_{NYQUIST})$=noise regularization frequency response at Nyquist frequency $$v_r = \text{radial frequency } v_r = \sqrt{(V_x^2 + V_y^2)}$$

$v_x$, $v_y$=spatial frequency in x and y directions.

10. The method according to claim 2 wherein the image data s signals produced by the radiation imaging system have an oversampled Nyquist frequency and, a frequency $\alpha$ at the transition between the inverse frequency response portion and the noise regularization n frequency response portion, and further comprising selecting the noise regularization frequency response portion of the filter as an $n^{th}$ order polynomial having:

a) continuity at $\alpha$;
b) a continuous slope at $\alpha$;
c) zero response at the oversampled Nyquist frequency; and
d) zero slope at the oversampled Nyquist frequency.

11. A method of generating a high resolution imaging of incident radiation in a radiation imaging system, comprising the steps of:

sequentially positioning an array of photosensor pixels in first through $K^{th}$ imaging positions in accordance with a predetermined imaging cycle, said photosensor pixels being disposed in said array in rows and columns having a predetermined photosensor pixel pitch therebetween which determines the imaging system's Nyquist frequency, each of said sequential imaging positions being selected such that the area imaged by each respective pixel overlaps a portion of the area imaged by said respective pixel while disposed in the preceding imaging position in said predetermined imaging cycle so as to oversample the imaged area;

storing the respective image data signals generated in each of the first through $K^{th}$ imaging positions; and deblurring the image data signals by passing said signals through a finite impulse response filter having a combined frequency response portion and a noise regularization frequency response portion wherein the noise regularization portion serves to decrease the frequency response of the filter as the frequency of the image data signals increase to thereby develop said high resolution image.

12. The method according to claim 11 wherein the combined frequency response of the filter is given by:

$$H(v_r) = \begin{cases} H_{inv}(v_r), v_r \leq \alpha \\ H_{reg}(v_r), v_r > \alpha \end{cases}$$

wherein: $H(v_r)$=combined frequency response
$H_{inv}(v_r)$=inverse filter frequency response
$H_{reg}(v_r)$=regulation frequency response $$v_r = \text{radial frequency } v_r = \sqrt{(V_x^2 + V_y^2)}$$

$v_x$, $v_y$=spatial frequencies in x and y directions
$\alpha$=transition frequency between inversion and regularization portions.

13. The method according to claim 12 further comprising selecting a regularization function of the filter as an $n^{th}$ order polynomial wherein:

$H_{reg}(\alpha)=H_{inv}(\alpha)$
$H_{inv}$=inverse filter frequency response
$H_{reg}$=regularization frequency response
$\alpha$=transition frequency between inverse filter frequency response portion and noise regularization frequency response portion.

14. The method according to claim 12 further comprising selecting a regularization function of the filter as an $n^{th}$ order polynomial wherein:

$$\frac{H_{reg}(\alpha)}{\partial v_r} = \frac{H_{inv}(\alpha)}{\partial v_r}$$

$H_{reg}$=regularization frequency response
$H_{inv}$=inverse filter frequency response $$v_r = \text{radial frequency } v_r = \sqrt{(V_x^2 + V_y^2)}$$

$v_x$, $v_y$=spatial frequencies in x and y directions
$\alpha$=transition frequency between inverse filter frequency response portion and noise regularization frequency response portion.

15. The method according to claim 11 wherein image data signals produced by the radiation imaging system have an oversampled Nyquist frequency and further comprising selecting the noise regularization frequency response portion of the filter as an $n^{th}$ order polynomial having zero response at the oversampled Nyquist frequency wherein:

$H_{reg}(v_{NYQUIST})=0$ where:

$H_{reg}(v_{NYQUIST})$=noise regularization frequency response at Nyquist frequency.

16. The method according to claim 11 wherein the image data signals produced by the radiation imaging system have an oversampled Nyquist frequency and further comprising selecting the noise regularization frequency response portion of the filter as an $n^{th}$ order polynomial having zero slope at the Nyquist frequency wherein:

$$\frac{H_{reg}(V_{Nyquist})}{\partial V_r} = 0$$

where:

$H_{reg}(v_{NYQUIST})$=noise regularization frequency response at Nyquist frequency $v_r$ = radial frequency $v_r = \sqrt{(V_x^2 + V_y^2)}$ vx, $v_y$=spatial frequency in x and y directions.

17. The method according to claim 11 wherein the image data signals produced by the radiation imaging system have an oversampled Nyquist frequency and, a frequency α at the transition between the inverse frequency response portion and the noise regularization frequency response portion, and further comprising selecting the noise regularization frequency response portion of the filter as an $n^{th}$ order polynomial having:

a) continuity at α;

b) a continuous slope at α;

c) zero response at the oversampled Nyquist frequency; and d) zero slope at the oversampled Nyquist frequency.

18. The method according to claim 12 wherein image data signals produced by the radiation imaging system have an oversampled Nyquist frequency and further comprising selecting the noise regularization frequency response portion of the filter as an $n^{th}$ order polynomial having zero response at the oversampled Nyquist frequency wherein:

$H_{reg}(v_{NYQUIST})=0$ where:

$H_{reg}(v_{NYQUIST})$=noise regularization frequency response at Nyquist frequency.

19. The method according to claim 12 wherein the image data signals produced by the radiation imaging system have an oversampled Nyquist frequency and further comprising selecting the noise regularization frequency response portion of the filter as an $n^{th}$ order polynomial having zero slope at the Nyquist frequency wherein:

$$\frac{H_{reg}(V_{Nyquist})}{\partial V_r} = 0$$

where:

$H_{reg}(v_{NYQUIST})$=noise regularization frequency response at Nyquist frequency $v_r$ = radial frequency $v_r = \sqrt{(V_x^2 + V_y^2)}$ $v_x$, $v_y$=spatial frequency in x and y directions.

20. The method according to claim 12 wherein the image data signals produced by the radiation imaging system have an oversampled Nyquist frequency and, a frequency α at the transition between the inverse frequency response portion and the noise regularization frequency response portion, and further comprising selecting the noise regularization frequency response portion of the filter as an $n^{th}$ order polynomial having:

a) continuity at α;

b) a continuous slope at α;

c) zero response at the oversampled Nyquist frequency; and d) zero slope at the oversampled Nyquist frequency.

21. The method of claim 11 wherein the step of sequentially positioning said array of photosensor pixels further comprises the step of displacing said photosensor pixel array in a selected sequence so that said array is respectively disposed at each of four imaging positions during said imaging cycle.

22. The method of claim 21 wherein the step of displacing said array further comprises sequentially translating said array along a first axis and a second axis, said first and second axes being orthogonal.

23. The method of claim 22 wherein the distance along said first and second axes between respective ones of said four imaging positions correspond to one-half of photosensor pixel pitch.

24. The method of claim 23 further comprising the step of driving a display and analysis module to present said high resolution data.

25. A radiation imaging system comprising:

a photosensor pixel array, said array adapted to generate an image data signal being sequentially disposed in selected ones of a plurality of sequential imaging positions pursuant to a predetermined imaging cycle, each of said sequential imaging positions being selected so as to oversample the imaged area; and an image processor coupled to said photosensor pixel array so as to receive the respective image data signals generated, said image processor being adapted to store said respective image data signals generated during an imaging cycle in each of said respective sequential imaging positions as an unfiltered data set, said image processor further comprising a finite impulse response deblurring filter adapted to selectively filter said data set to generate a non-aliased fine resolution data set having spatial resolution greater than the imaging system Nyquist frequency determined by pixel pitch of said photosensor, array, said deblurring filter having a combined frequency response comprising an inverse filter frequency response portion and a noise regularization frequency response portion wherein the noise regularization decreases the frequency response of the filter as the frequency of the signal increases.

26. An imaging system according to claim 25 wherein the combined frequency response of the filter is given by:

$$H(v_r) = \begin{cases} H_{inv}(v_r), & v_r \le \alpha \\ H_{reg}(v_r), & v_r > \alpha \end{cases}$$

wherein:
$H(v_r)$=combined frequency response
$H_{inv}(v_r)$=inverse filter frequency response
$H_{reg}(v_r)$=regulation frequency response $$v_r = \text{radial frequency } v_r = \sqrt{(V_x^2 + V_y^2)}$$

$v_x$, $v_y$=spatial frequencies in x and y directions
$\alpha$=transition frequency between inversion and regularization portions.

27. An imaging system according to claim 26 wherein the regularization function of the filter in an $n^{th}$ order polynomial wherein:

$H_{reg}(\alpha) = H_{inv}(\alpha)$
$H_{inv}$=inverse filter frequency response
$H_{reg}$=regularization frequency response
$\alpha$=transition frequency between inverse filter frequency response portion and noise regularization frequency response portion.

28. In imagine system according to claim 26 wherein the regularization function of the filter is an nt order polynomial wherein:

$$\frac{H_{reg}(\alpha)}{\partial v_r} = \frac{H_{inv}(\alpha)}{\partial v_r}$$

$H_{reg}$=regularization frequency response
$H_{inv}$=inverse filter frequency response $$v_r = \text{radial frequency } v_r = \sqrt{(V_x^2 + V_y^2)}$$

$v_x$, $v_y$=spatial frequencies in x and y directions
$\alpha$=transition frequency between inverse filter frequency response portion and noise regularization frequency response portion.

29. An imaging system according to claim 25 wherein the noise regularization frequency response portion of the filter is an $n^{th}$ order polynomial having zero response at the oversampled Nyquist frequency wherein:

$H_{reg}(v_{NYQUIST})=0$
where:
$H_{reg}(v_{NYQUIST})$=noise regularization frequency response at Nyquist frequency.

30. An imaging system according to claim 25 wherein he image data signals produced by the radiation imaging system have an oversampled Nyquist frequency and wherein the noise regularization frequency response portion of the filter is an $n^{th}$ order polynomial having zero slope at the Nyquist frequency wherein:

$$\frac{H_{reg}(V_{Nyquist})}{\partial V_r} = 0$$

where:
$H_{reg}(v_{NYQUIST})$=noise regularization frequency response at Nquist frequency $$v_r = \text{radial frequency } v_r = \sqrt{(V_x^2 + V_y^2)}$$

$v_x$, $v_y$=spatial frequency in x and y directions.

31. An imaging system according to claim 25 wherein the image data signals produced by the radiation imaging system have an oversampled Nyquist frequency and, a frequency $\alpha$ at the transition between the inverse frequency response portion and the noise regularization frequency response portion of the combined frequency response of the filter and the noise regularization frequency response portion of the filter is an $n^{th}$ order polynomial having:

a) continuity at $\alpha$;
b) a continuous slope at $\alpha$;
c) zero response at the oversampled Nyquist frequency; and
d) zero slope at the oversampled Nyquist frequency.

32. An imaging system according to claim 26 wherein the image data signals produced by the radiation imaging system have an oversampled Nyquist frequency and wherein the noise regularization frequency response portion of the filter as an $n^{th}$ order polynomial having zero response at the oversampled Nyquist frequency wherein:

$H_{reg}(v_{NYQUIST})=0$
where:
$H_{reg}(v_{NYQUIST})$=noise regularization frequency response at Nyquist frequency.

33. An imaging system according to claim 26 wherein the image data signals produced by the radiation imaging system have an oversampled Nyquist frequency and wherein the noise regularization frequency response portion of the filter is an $n^{th}$ order polynomial having zero slope at the Nyquist frequency wherein:

$$\frac{H_{reg}(V_{Nyquist})}{\partial V_r} = 0$$

where:
$H_{reg}(v_{NYQUIST})$=noise regularization frequency response at Nyquist frequency $$v_r = \text{radial frequency } v_r = \sqrt{(V_x^2 + V_y^2)}$$

$v_x$, $v_y$=spatial frequency in x and y directions.

34. An imaging system according to claim 26 wherein the image data signals produced by the radiation imaging system have an oversampled Nyquist frequency and, a frequency $\alpha$ at the transition between the inverse frequency response portion and the noise regularization frequency response portion, and wherein the noise regularization frequency response portion of the filter is an $n^{th}$ order polynomial having:

a) continuity at $\alpha$;
b) a continuous slope at $\alpha$;
c) zero response at the oversampled Nyquist frequency; and
d) zero slope at the oversampled Nyquist frequency.

* * * * *